US009995443B2

(12) United States Patent
Lai

(10) Patent No.: US 9,995,443 B2
(45) Date of Patent: Jun. 12, 2018

(54) APPARATUS FOR ADJUSTING THE ORIENTATION OF A MOVABLE PHOTOVOLTAIC LAMPPOST

(71) Applicant: Avertronics Inc., Taichung (TW)

(72) Inventor: Bing-Yuan Lai, Taichung (TW)

(73) Assignee: Avertronics Inc., Taichung (TW)

( * ) Notice: Subject to any disclaimer, the term of this patent is extended or adjusted under 35 U.S.C. 154(b) by 142 days.

(21) Appl. No.: 15/253,942

(22) Filed: Sep. 1, 2016

(65) Prior Publication Data

US 2018/0058646 A1    Mar. 1, 2018

(51) Int. Cl.
    *F21L 4/04*      (2006.01)
    *F21L 4/08*      (2006.01)
    *F21V 21/14*      (2006.01)
    *H02S 20/30*      (2014.01)

(52) U.S. Cl.
    CPC    *F21L 4/08* (2013.01); *F21L 4/04* (2013.01); *F21V 21/145* (2013.01); *H02S 20/30* (2014.12)

(58) Field of Classification Search
CPC . E04H 12/18–12/187; F21L 4/04; F21L 4/08; F21L 14/04; F21S 8/08; F21S 8/085; F21S 8/088; F21S 9/03–9/037; F21V 21/14; F21V 21/145; F21V 21/30; F21V 21/34
See application file for complete search history.

(56) References Cited

U.S. PATENT DOCUMENTS

| | | | | |
|---|---|---|---|---|
| 5,794,387 A | * | 8/1998 | Crookham | F21V 21/36 52/122.1 |
| 2015/0215587 A1 | * | 7/2015 | Carpoff | F21L 13/00 348/143 |

\* cited by examiner

*Primary Examiner* — Anh Mai
*Assistant Examiner* — Steven Horikoshi
(74) *Attorney, Agent, or Firm* — Alan D. Kamrath; Kamrath IP Lawfirm, P.A.

(57) ABSTRACT

A photovoltaic system includes a trailer, a solar panel, a battery, a lamppost, a turret, a shackle, a horizontal position-adjusting unit and an orientation-retaining unit. The trailer includes a cage supported on a chassis. The solar panel is supported on the cage. The battery is supported on the chassis and electrically connected to the solar panel. The lamppost includes a lamp supported thereon and electrically connected to the battery. The turret rotationally connects the lamppost to the chassis. The shackle is provided around the lamppost. The horizontal position-adjusting unit movably connects the shackle to the cage. The orientation-retaining unit retains the lamppost in a desired orientation relative to the shackle.

11 Claims, 6 Drawing Sheets

APPARATUS FOR ADJUSTING THE ORIENTATION OF A MOVABLE PHOTOVOLTAIC LAMPPOST

BACKGROUND OF INVENTION

1. Field of Invention

The present invention relates to a movable photovoltaic lamppost and, more particularly, to an apparatus for adjusting the orientation of a movable photovoltaic lamppost.

2. Related Prior Art

A conventional photovoltaic system includes a trailer, a solar panel, a battery, a lamppost and a controller. The trailer includes a cage supported on a chassis. The solar panel is supported on the cage. The solar panel can be collapsed for storage or transportation or expanded for operation. In operation, the solar panel turns solar energy into electricity that is stored in the battery. A lamp is supported on the lamppost and electrically connected to the battery. The trailer can be attached to a vehicle. Thus, the vehicle can be used to toll the photovoltaic device to places where the photovoltaic device is used as the primary generator or a backup generator. The lamppost is an extensible element so that the elevation of the lamp can be adjusted. However, the orientation of the lamp cannot be adjusted without changing the orientation of the entire photovoltaic device.

The present invention is therefore intended to obviate or at least alleviate the problems encountered in prior art.

SUMMARY OF INVENTION

It is the primary objective of the present invention to provide a convenient photovoltaic system.

To achieve the foregoing objective, the photovoltaic system includes a trailer, a solar panel, a battery, a lamppost, a turret, a shackle, a horizontal position-adjusting unit and an orientation-retaining unit. The trailer includes a cage supported on a chassis. The solar panel is supported on the cage. The battery is supported on the chassis and electrically connected to the solar panel. The lamppost includes a lamp supported thereon and electrically connected to the battery. The turret rotationally connects the lamppost to the chassis. The shackle is provided around the lamppost. The horizontal position-adjusting unit movably connects the shackle to the cage. The orientation-retaining unit retains the lamppost in a desired orientation relative to the shackle.

Advantageously, the lamppost is rotationally connected to the chassis by the turret. Thus, the lamppost can be located in any desired orientation. The orientation-retaining unit retains the lamppost in the desired orientation.

Advantageously, the shackle is provided around the lamppost to prevent horizontal movement and waving of the lamppost.

Advantageously, the horizontal position-adjusting element allows adjustment of the horizontal position of the shackle to compensate errors in the location of the lamppost on the chassis via the turret. That is, bending of the lamppost is prevented.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
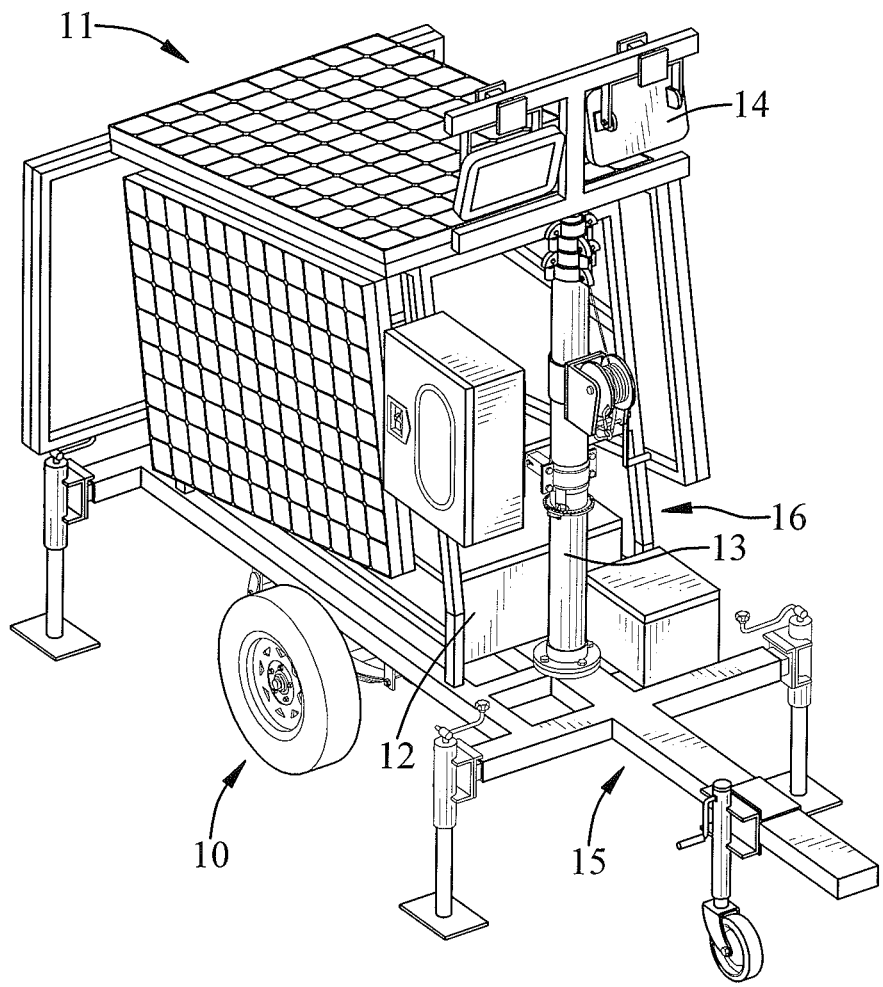
FIG. 1 is a perspective view of a movable photovoltaic system according to the preferred embodiment of the present invention.
Figure 2:
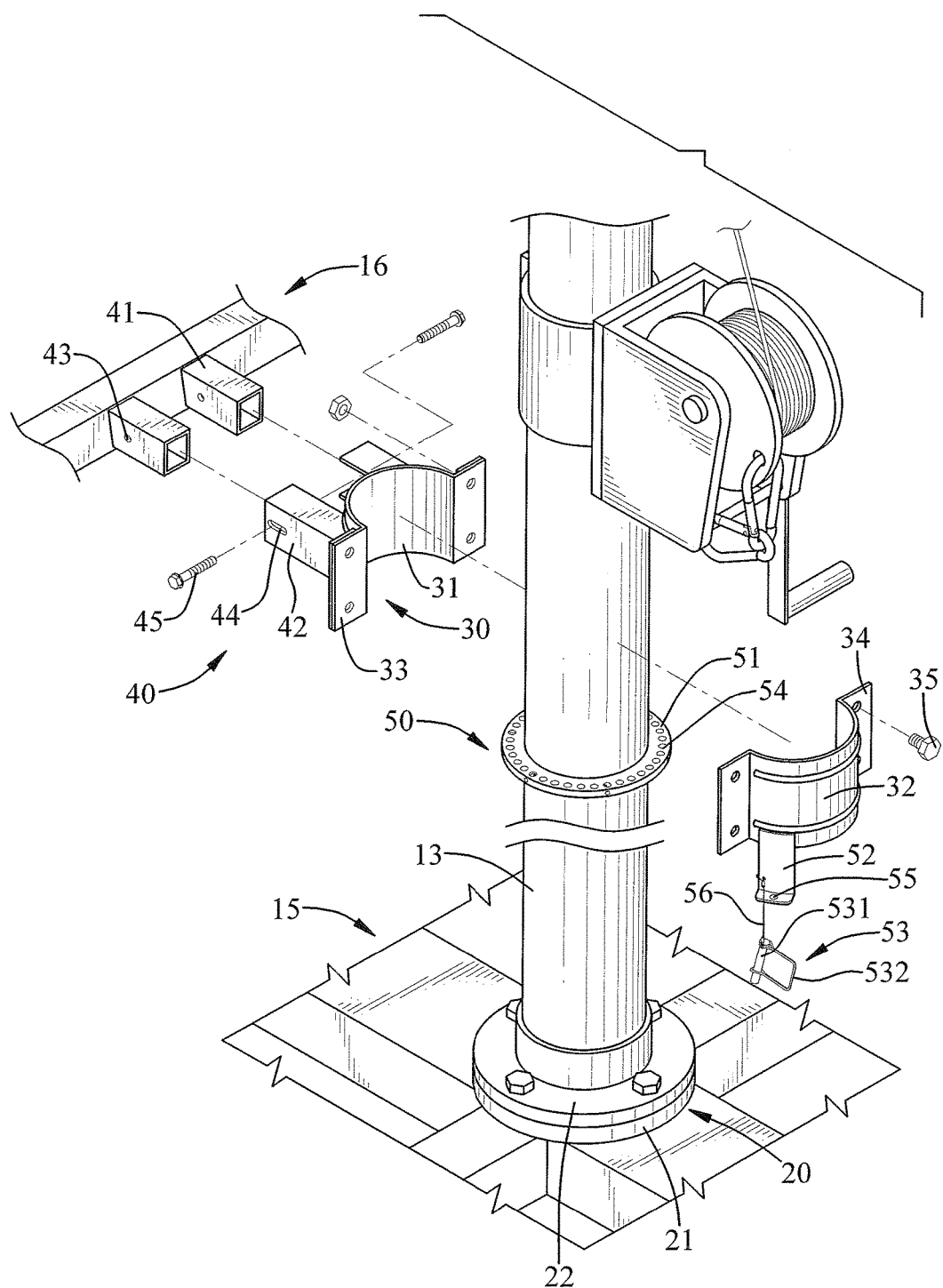
FIG. 2 is an exploded view of an orientation-adjusting apparatus of the movable photovoltaic system shown in FIG. 1.
Figure 3:
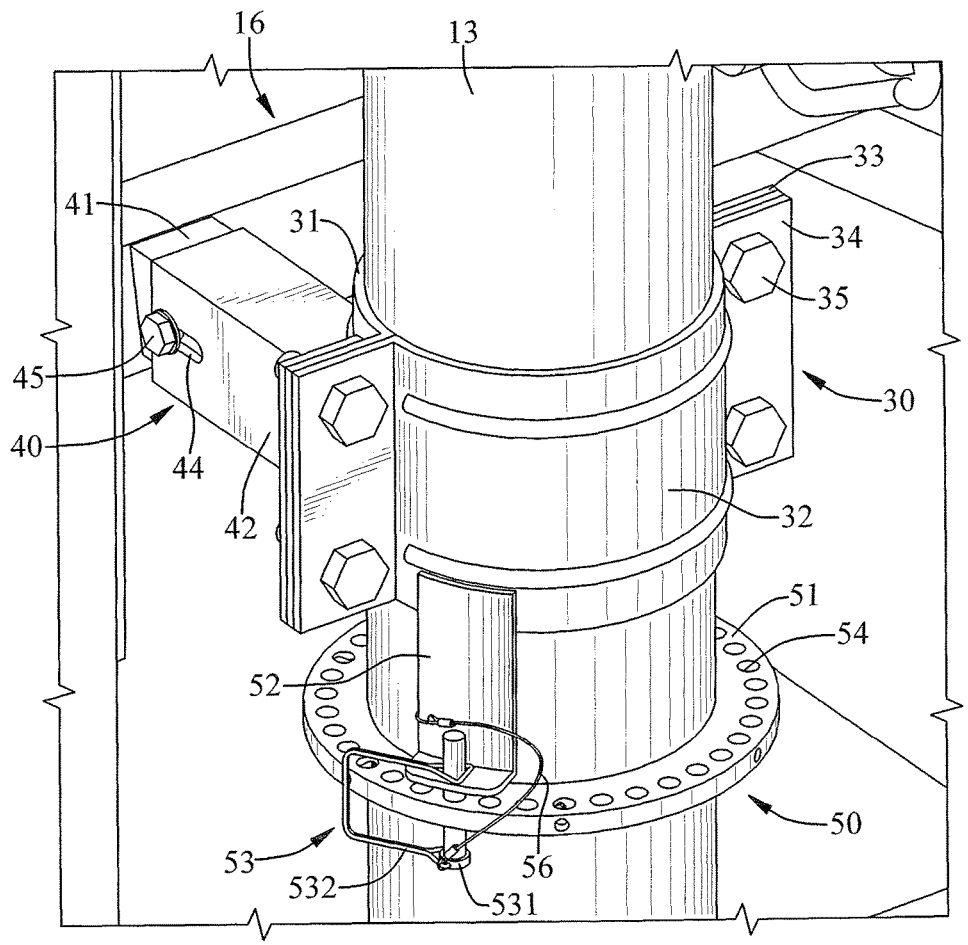
FIG. 3 is a perspective view of the orientation-adjusting apparatus shown in FIG. 2.

Referring to FIGS. 1 through 3, a photovoltaic system includes a trailer 10, a solar panel 11, a battery 12, a lamppost 13, a turret 20, a shackle 30, a horizontal position-adjusting unit 40 and an orientation-retaining unit 50 according to the preferred embodiment of the present invention. The trailer 10 includes a cage 16 supported on a chassis 15. The solar panel 11 is supported on the cage 16. The solar panel 11 is changeable between a collapsed position and an expanded position. The solar panel 11 is in the collapsed position during the storage or transportation of the photovoltaic system. The solar panel 11 is in the extended position during the operation of the photovoltaic system. The battery 12 is supported on the chassis 15 and electrically connected to the solar panel 11. A lamp 14 is supported on the lamppost 13 and electrically connected to the battery 12.

Referring to FIG. 2, the lamppost 13 is rotationally connected to the chassis 15 via a turret 20 so that the orientation of the lamp 14, which is supported on the lamppost 13, can be changed. The turret 20 includes a stationary disc 21, a rotational disc 22 and a bearing (not shown) provided between the stationary disc 21 and the rotational disc 22. The stationary disc 21 is connected to an upper face of the chassis 15. The rotational disc 22 is connected to a lower end of the lamppost 13.

Referring to FIGS. 2 and 3, the shackle 30 avoids horizontal movement and waving of the lamppost 13. The horizontal position-adjusting unit 40 allows the horizontal position of the shackle 30 to be adjusted. The orientation-retaining unit 50 retains the orientation of the lamppost 13.

The shackle 30 includes two claws 31 and 32. The claw 31 is a substantially C-shaped element that includes an arched portion formed between two flat portions 33. The claw 32 is also a substantially C-shaped element that includes an arched portion formed between two flat portions 34. The claw 31 is connected to the cage 16 via the horizontal position-adjusting unit 40. The claw 31 is provided on a side of the lamppost 13 and the claw 32 is provided on an opposite side of the lamppost 13 before fasteners 35 such as screws are inserted in the flat portions 33 and 34 to keep the shackle 30 closed.

The horizontal position-adjusting unit 40 includes at least one and preferably two telescopic connectors each including a tube 41 movably inserted in a tube 42. The tubes 41 are connected to the cage 16. The tubes 42 are connected to the claw 31. Each of the tubes 41 includes an aperture 43. Each of the tubes 42 includes a longitudinal slot 44. A fastener 45 such as a screw is inserted in the aperture 43 of each tube 41 and the longitudinal slot 44 of each tube 42 to keep them in position relative to each other.

The orientation-retaining unit 50 includes a ring 51, a tab 52 and a lock 53. The ring 51 is connected to the lamppost 13. The ring 51 includes apertures 54. The tab 52 is connected to the second claw 32. The tab 52 includes an aperture 55. The lock 53 includes a pin 531 and a C-clip 532. An end of the C-clip 532 is pivotally connected to an end of the pin 531. Another end of the C-clip 532 is formed with a loop that can be provided around another end of the pin 531. The loop of the C-clip 532 is provided around the pin 531 after the pin 531 is inserted in the aperture 55 and a selected one of the apertures 54 to keep the lamppost 13 in a selected one of various orientations corresponding to the apertures 54. Preferably, the pin 531 is connected to the tab 52 by a flexible connector 56 such as a cable so that the lock 53 will not be lost. Alternatively, the pin 531 can be connected to the ring 51 by the flexible connector 56.

Figure 4:
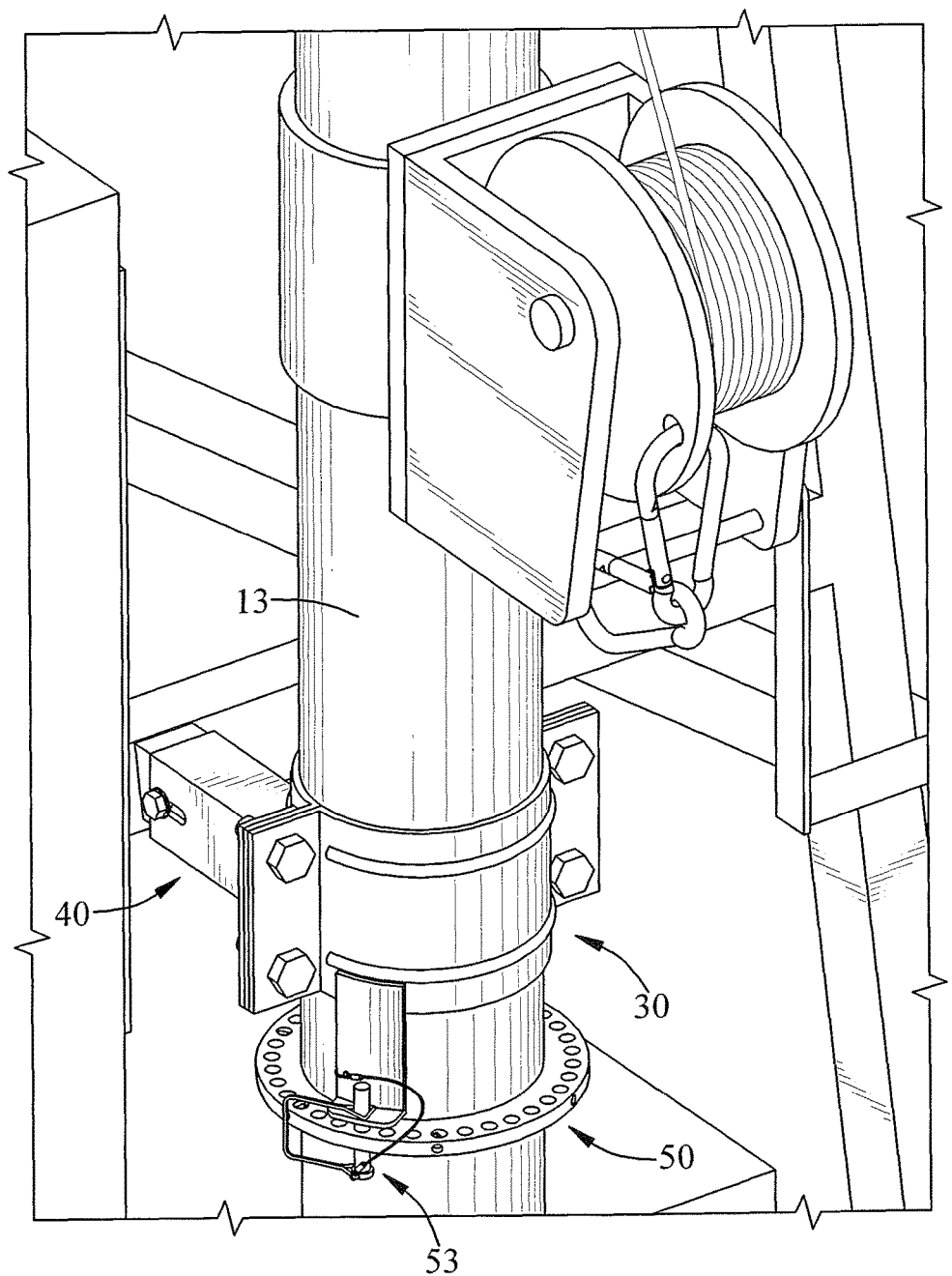
FIG. 4 is a reduced perspective view of the orientation-adjusting apparatus shown in FIG. 3.
Figure 5:
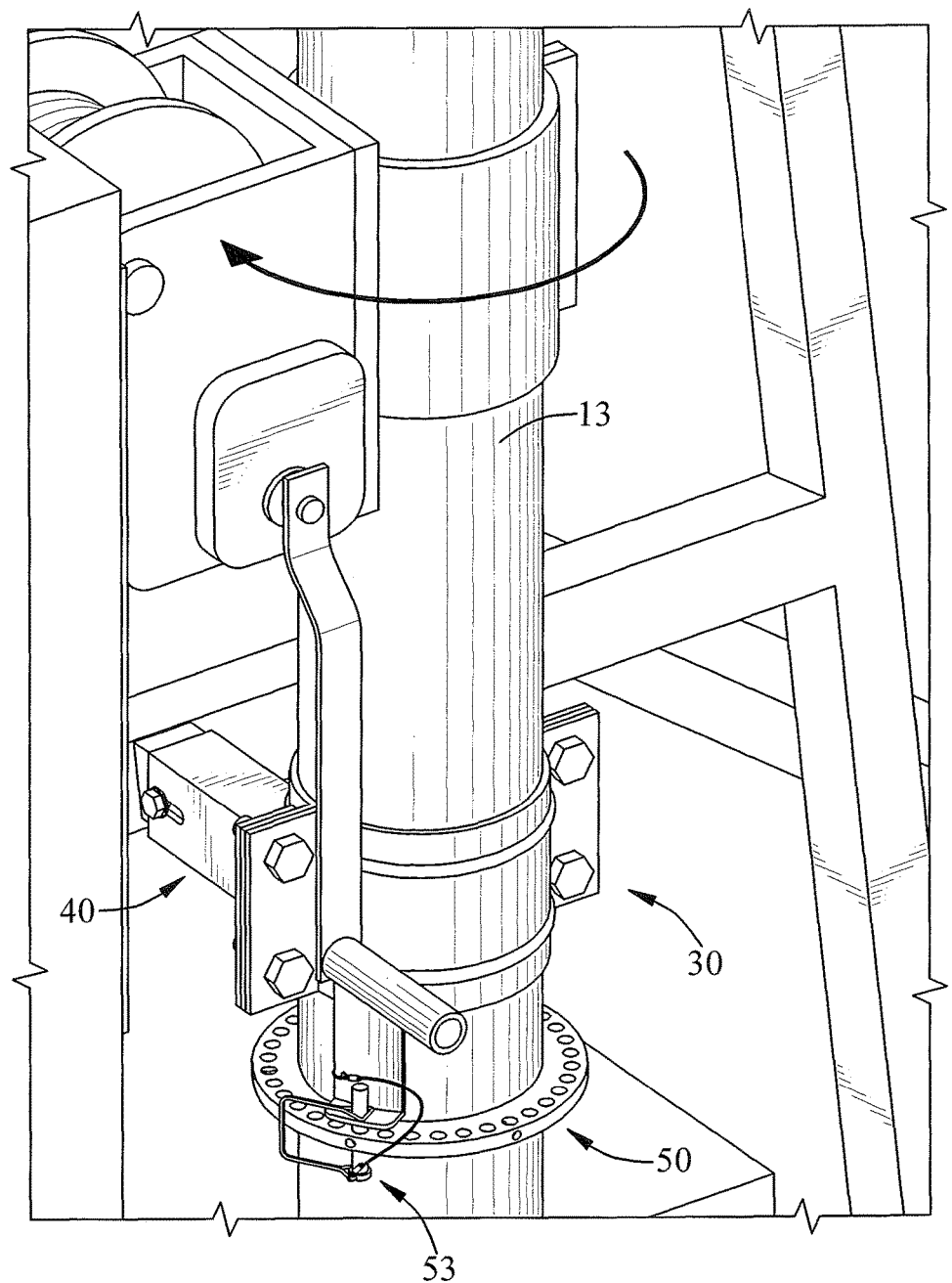
FIG. 5 is a perspective view of the orientation-adjusting apparatus in another orientation than shown in FIG. 4.
Figure 6:
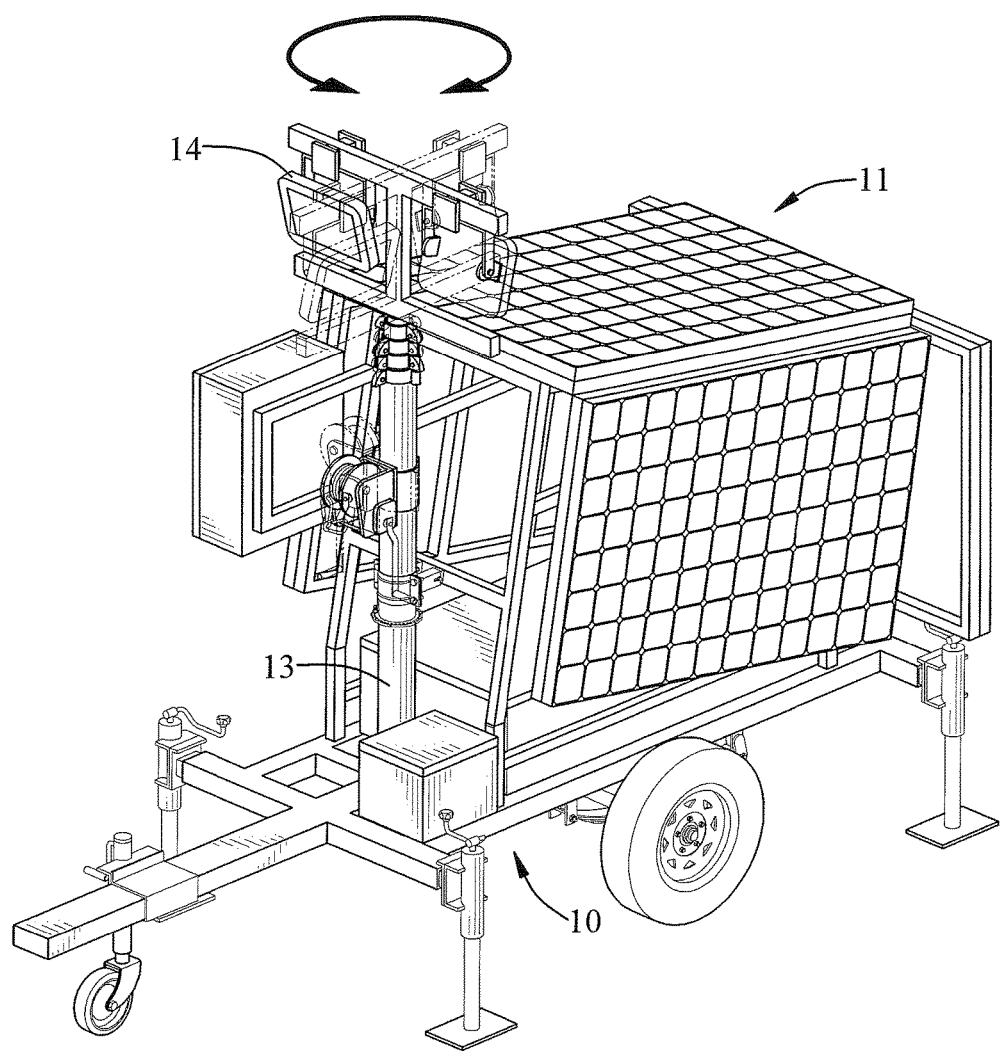
FIG. 6 is a perspective view of the movable photovoltaic system with a lamppost in another orientation than shown in FIG. 1.

Referring to FIGS. 4 through 6, to change the orientation of the lamp 14, which is supported on the lamppost 13, the loop of the C-clip 532 is removed from the pin 531 before the pin 531 is removed from the apertures 54 and 55. The turret 20 ensures smooth rotation of the lamppost 13 and the lamp 14 to a desired orientation. Then, the pin 531 is inserted in the aperture 55 and a desired one of the apertures 54 before the loop of the C-clip 532 is provided around the pin 531 again.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A photovoltaic system comprising:
   a trailer (10) comprising a chassis (15) and a cage (16) supported on the chassis (15);
   a solar panel (11) supported on the cage (16);
   a battery (12) supported on the chassis (15) and electrically connected to the solar panel (11);
   a lamppost (13) comprising a lamp (14) supported thereon and electrically connected to the battery (12);
   a turret (20) for rotationally connecting the lamppost (13) to the chassis (15);
   a shackle (30) provided around the lamppost (13);
   a horizontal position-adjusting unit (40) for connecting the shackle (30) to the cage (16);
   an orientation-retaining unit (50) for retaining the lamppost (13) in a desired orientation relative to the shackle (30).

2. The photovoltaic system according to claim 1, wherein the turret (20) comprises a stationary disc (21) connected to an upper face of the chassis (15) and a rotational disc (22) connected to a lower end of the lamppost (13).

3. The photovoltaic system apparatus according to claim 1, wherein the shackle (30) comprises a first claw (31) connected to the horizontal position-adjusting unit (40) and a second claw (32) connected to the first claw (31).

4. The photovoltaic system according to claim 3, wherein the horizontal position-adjusting unit (40) comprises at least one telescopic connector comprises an end connected to the cage (16) and another end connected to the first claw (31).

5. The photovoltaic system according to claim 4, wherein the telescopic connector comprises a first tube (41) connected to the cage (16), a second tube (42) connected to the first claw (31), and a fastener (45) adapted for keeping the first tube (41) in position relative to the second tube (42).

6. The photovoltaic system according to claim 5, wherein the first tube (41) comprises an aperture (43), the second tube (42) comprises a longitudinal slot (44), and the fastener (45) is inserted in the aperture (43) and the longitudinal slot (44) to keep the first tube (41) in position relative to the second tube (42).

7. The photovoltaic system according to claim 1, wherein the orientation-retaining unit (50) comprises a ring (51) formed on the lamppost (13), a tab (52) formed on the second claw (32), and a lock (53) adapted for locking the ring (51) to the tab (52).

8. The photovoltaic system according to claim 7, wherein the ring (51) comprises apertures (54), the tab (52) comprises an aperture (55), and a lock (53) is adapted for insertion in the aperture (55) of the tab (52) and a selected one of the apertures (54) of the ring (51).

9. The photovoltaic system according to claim 8, wherein the lock (53) comprises a pin (531) adapted for insertion in the aperture (55) of the tab (52) and a C-clip (532) formed with an end pivotally connected to an end of the pin (531) and another end formed with a lap that can be provided around another end of the pin (531).

10. The photovoltaic system according to claim 7, wherein the orientation-retaining unit (50) comprises a flexible connector (56) for connecting the lock (53) to one of the ring (51) and the tab (52).

11. The photovoltaic system according to claim 10, wherein the flexible connector (56) connects the lock (53) to the tab (52).

* * * * *